(12) United States Patent
Keim et al.

(10) Patent No.: US 8,840,400 B2
(45) Date of Patent: Sep. 23, 2014

(54) METHOD AND APPARATUS FOR IMPROVING LANGUAGE COMMUNICATION

(75) Inventors: Gregory Keim, Broadway, VA (US); Jack August Marmorstein, Harrisonburg, VA (US); Michael Scott Fulkerson, Harrisonburg, VA (US); Ronald Bryce Inouve, Harrisonburg, VA (US); Alisha Huber, Dayton, VA (US)

(73) Assignee: Rosetta Stone, Ltd., Arlington, VA (US)

( * ) Notice: Subject to any disclaimer, the term of this patent is extended or adjusted under 35 U.S.C. 154(b) by 883 days.

(21) Appl. No.: 12/488,778

(22) Filed: Jun. 22, 2009

(65) Prior Publication Data

US 2010/0323332 A1    Dec. 23, 2010

(51) Int. Cl.
*G09B 19/08* (2006.01)
*G09B 29/06* (2006.01)

(52) U.S. Cl.
CPC .................................. *G09B 29/06* (2013.01)
USPC .......................................... 434/156; 434/157

(58) Field of Classification Search
USPC ................................................ 434/156–157
See application file for complete search history.

(56) References Cited

U.S. PATENT DOCUMENTS

| | | | | |
|---|---|---|---|---|
| 4,067,122 | A * | 1/1978 | Fernandez et al. | 434/157 |
| 5,697,789 | A * | 12/1997 | Sameth et al. | 434/157 |
| 5,810,598 | A * | 9/1998 | Wakamoto | 434/156 |
| 6,077,085 | A | 6/2000 | Parry et al. | |
| 6,287,123 | B1 | 9/2001 | O'Brien | |
| 6,302,695 | B1 * | 10/2001 | Rtischev et al. | 434/157 |
| 6,409,510 | B1 * | 6/2002 | Firebaugh | 434/157 |
| 6,721,416 | B1 * | 4/2004 | Farrell | 379/265.07 |
| 6,847,714 | B2 * | 1/2005 | Das et al. | 379/265.12 |
| 7,542,908 | B2 * | 6/2009 | Segond et al. | 704/277 |
| 7,711,105 | B2 * | 5/2010 | Basson et al. | 379/265.12 |
| 2001/0029455 | A1 * | 10/2001 | Chin et al. | 704/277 |

(Continued)

FOREIGN PATENT DOCUMENTS

| | | |
|---|---|---|
| EP | 0 643 380 A2 | 3/1995 |
| JP | H07-129190 | 5/1995 |

(Continued)

OTHER PUBLICATIONS

Blaine R. Copenheaver, "International Patent Application No. PCT/US2010/038241 International Search Report and Written Opinion", Aug. 30, 2010, Publisher: PCT, Published in: US.

(Continued)

*Primary Examiner* — Robert J Utama

(57) ABSTRACT

In a communication between individuals having different levels of skill in a language, communication by the more skilled individual is controlled so as to keep it at a level understandable by the lesser skilled individual. For example, a native speaker's communication with a student learning his language (the target language) is monitored by an interface and compared with a stored model representing the student's knowledge and ability in the language. Should the native speaker communicate in a way that would not be understood by the student, for example, by using vocabulary or a sentence structure beyond the student's ability, the interface will notify the native speaker. The interface might then suggest an alternate word or sentence structure to the native speaker, inviting him to use the alternate communication. The native speaker can then substitute and send the alternate communication.

70 Claims, 3 Drawing Sheets

(56) References Cited

U.S. PATENT DOCUMENTS

| | | | |
|---|---|---|---|
| 2002/0072039 A1* | 6/2002 | Rtischev et al. | 434/157 |
| 2002/0150869 A1* | 10/2002 | Shpiro | 434/156 |
| 2003/0008267 A1 | 1/2003 | Boon | |
| 2003/0129574 A1 | 7/2003 | Ferriol et al. | |
| 2004/0076934 A1* | 4/2004 | Wen et al. | 434/157 |
| 2004/0215453 A1 | 10/2004 | Orbach | |
| 2005/0026131 A1 | 2/2005 | Elzinga et al. | |
| 2006/0053012 A1 | 3/2006 | Eayrs | |
| 2006/0167992 A1* | 7/2006 | Cheung et al. | 709/204 |
| 2006/0183088 A1* | 8/2006 | Masuko | 434/157 |
| 2007/0172799 A1* | 7/2007 | Aubert | 434/157 |
| 2008/0003551 A1* | 1/2008 | Narayanan et al. | 434/157 |
| 2008/0109224 A1 | 5/2008 | Dvorak et al. | |
| 2008/0205629 A1* | 8/2008 | Basson et al. | 379/265.12 |
| 2008/0261181 A1* | 10/2008 | Kennedy et al. | 434/157 |
| 2008/0293020 A1* | 11/2008 | Jang | 434/157 |
| 2008/0294440 A1 | 11/2008 | Higgins et al. | |
| 2008/0299523 A1* | 12/2008 | Chai et al. | 434/157 |
| 2009/0053681 A1* | 2/2009 | Shen et al. | 434/157 |
| 2009/0061399 A1* | 3/2009 | Freeman et al. | 434/157 |
| 2009/0061407 A1 | 3/2009 | Keim | |
| 2009/0094517 A1* | 4/2009 | Brody et al. | 715/706 |
| 2009/0138791 A1 | 5/2009 | Kamada et al. | |
| 2009/0186322 A1* | 7/2009 | Johnson | 434/157 |
| 2009/0191519 A1* | 7/2009 | Wakamoto et al. | 434/157 |
| 2009/0217196 A1* | 8/2009 | Neff et al. | 715/799 |
| 2009/0248392 A1* | 10/2009 | Talwar et al. | 704/3 |
| 2010/0081115 A1* | 4/2010 | Harding et al. | 434/157 |
| 2010/0304342 A1* | 12/2010 | Zilber | 434/157 |

FOREIGN PATENT DOCUMENTS

| | | |
|---|---|---|
| JP | 2000-089882 | 3/2000 |
| JP | 2003-281017 | 10/2003 |
| JP | 2007-519047 | 7/2007 |
| JP | 2009-134344 | 7/2009 |
| WO | WO 2005/071665 A1 | 8/2005 |
| WO | 2005115559 A2 | 12/2005 |

OTHER PUBLICATIONS

Ali Mian, "Canadian Patent Application 2766549 Office Action", Oct. 11, 2012, Published in: CA.

Blaine R. Copenheaver, "International Patent Application No. PCT/US2008/071466 International Preliminary Report on Patentability", Mar. 2, 2010, Published in: US.

Blaine R. Copenheaver, "International Patent Application No. PCT/US2008/071466 International Search Report and Written Opinion", Nov. 12, 2008, Publisher: PCT, Published in: US.

Notification of Rejection for Japanese Application No. 2012-51766, mailed Apr. 16, 2013.

Office Action for Canadian Patent Application No. 2,766,549, dated Dec. 13, 2013.

Notification of Rejection for Japanese Patent Application 2012-517566, dated Dec. 17, 2013.

Notice of Preliminary Rejection for Korean Patent Application No. 10-2012-7001757, mailed Jul. 4, 2013.

Notice of Preliminary Rejection for Korean Patent Application No. 10-2012-7001757, mailed May 19, 2014.

* cited by examiner

METHOD AND APPARATUS FOR IMPROVING LANGUAGE COMMUNICATION

BACKGROUND OF THE INVENTION

The present invention relates generally to improving language communication and, more particularly, concerns a method and apparatus for improving understanding between persons having different levels of skill in a target language when they communicate in the target language.

Increasingly, communications are carried on between individuals with different levels of skill in the language of communication. For example, a businessman who is a native English speaker may be communicating in English with a foreign colleague whose level of skill in English is far below his. In the course of a discussion, for example by telephone, the English speaker may converse at a level which is beyond his colleague's ability. Communication can suffer because of incomplete or incorrect understanding. In extreme circumstances, the foreign colleague can become overwhelmed fairly quickly. The English speaker is usually not aware of the deteriorating communication, and the foreign colleague may not tell, owing to embarrassment.

In learning a foreign language, much is to be gained by a student from communicating with a native speaker of the language. Not only does the student learn a natural style of communication, but he becomes immersed in the rhythm and flow of the language. This is particularly true when it comes to verbal communication. However, unless the student learning the language is a fairly advanced student, it becomes all too likely that the native speaker's vocabulary or sentence structure will be too sophisticated for the student, or the native speaker's speed of communication may be too fast. Consequently, the student may not understand enough of the native speaker's communication to benefit fully from the experience, or he may not be able to keep up with the native speaker.

Therefore, there exists a need to improve communications between individuals having substantially different levels of skill in a language to communicate, most particularly, for the purpose of allowing a language learner of a target language to practice with a native speaker.

SUMMARY OF THE INVENTION

In accordance with one aspect of the present invention, in a communication between individuals having different levels of skill in a language, communication by the more skilled individual is controlled so as to keep it at a level understandable by the lesser skilled individual. For example, a native speaker's communication with a student learning his language (the target language) is monitored by an interface and compared with a stored model representing the student's knowledge and ability in the language. Should the native speaker communicate in a way that would not be understood by the student, for example, by using vocabulary or a sentence structure beyond the student's ability, the interface will notify the native speaker. The interface might then suggest an alternate word or sentence structure to the native speaker, inviting him to use the alternate communication. The native speaker can then substitute the suggested alternative language and send on the alternate communication.

Alternately, such as when a word that is not in the student's vocabulary but is at his level, or when it is in an upcoming lesson, the interface might permit the native speaker's communication to be received by the student, but it could include an explanation or an image defining the unknown word.

In any event, the lesser skilled individual receives the maximum benefit from communicating with a higher skilled individual, and the understanding between them is improved by ensuring that the communication will not be beyond the ability of the lesser skilled individual.

BRIEF DESCRIPTION OF THE DRAWINGS

The foregoing brief description and further objects, features and advantages of the present invention will be understood more completely from the following detailed description of a presently preferred, but nonetheless illustrative, embodiments in accordance with the present invention, with reference being had to the accompanying drawings in which.

DETAILED DESCRIPTION OF THE PREFERRED EMBODIMENTS

Figure 1:
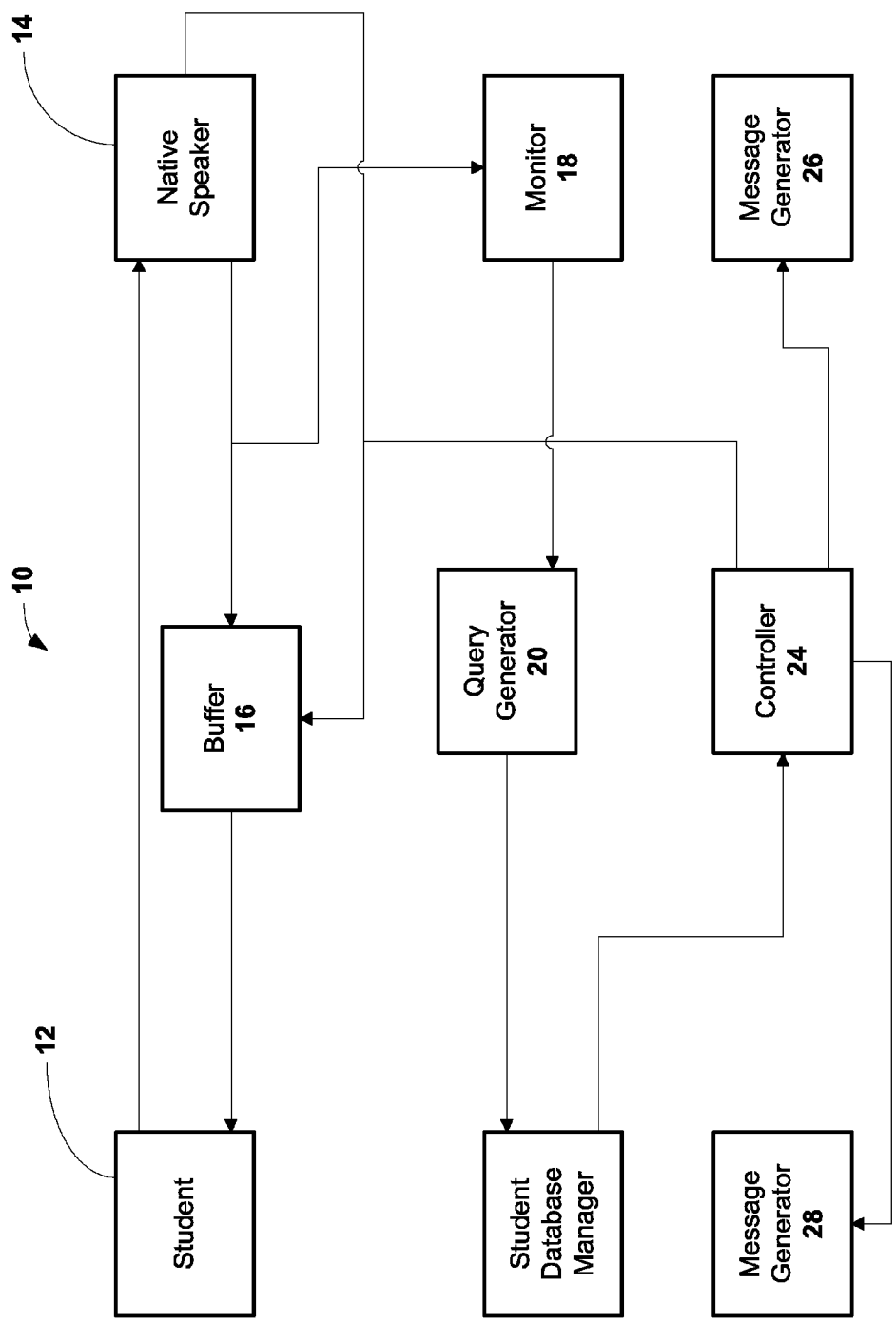
FIG. 1 is a functional block diagram illustrating a language skills teaching system embodying the present invention.

Turning now to the drawings, FIG. 1 is a functional block diagram illustrating a language skills teaching system 10 embodying the present invention. A student learning a target language and a native speaker of the language communicate in the language with respective communication devices 12, 14. Preferably, communication devices 12, 14 are personal computers or communication terminals, but they may be any type of communication devices, such as a smart telephone or al PDA. Preferably, communication is verbal, so communication devices 12, 14 will include some form of microphone and means for playing an audible signal.

The student's terminal 12 communicates with the native speaker's terminal 14 by sending thereto a verbal communication in the target language from the student. The native speaker responds, in the target language, and his response is stored in a buffer 16. The native speaker's response is also provided to a monitor 18, which isolates language elements like vocabulary words and grammatical structures from his response and provides them to a query generator 20. Query generator 20 then formulates an appropriate query for a database manager 22 which contains the student's database, representing his skill in the target language. Query generation and database management are well known technologies. Similarly, the use of speech recognition used to convert speech to text for use by the database is a well known technology.

The student's database contains a current description of the student's ability in the target language. It may include the complete vocabulary known by the student and a complete description of his ability in the target language.

Such a database could be derived from a computerized teaching machine being used by the student to learn the target language. Such a system is described in copending application Ser. No. 12/052,435, owned by the assignee of the present invention, and the contents of which are hereby fully incorporated by reference.

Alternately, the description may simply include a vocabulary level indicator for the target language, and the query could then be directed to a central database containing the entire vocabulary for that level. In either event, the query containing the words in the native speaker's response is addressed to the database, and a determination is made whether the student should understand all of the words in the query.

Those skilled in the art will appreciate that further levels of sophistication may be incorporated within the query. For example, the query could include a description of the sentence structure of the native speaker's response, and the database could include a description of the sentence structures understood by the student. It would then be possible to determine whether or not, apart from the vocabulary, the student would understand the sentence structure. Tense and grammatical form can also be processed in a similar manner. Similarly, the database could include information regarding words that the student will be learning soon, so a determination could be made whether it might be beneficial for the student to be exposed to such words. In such a case, an image or other hind can be given to the student, which image or hint would not be given if the words used were already known to the student.

In response to the query, database manager 22 provides a response to a controller 24 related to the last query. The response might be a simple indication that the words of the query are all within the vocabulary understood by the student in the target language. In that case, controller 24 enables buffer 16 to transmit the native speaker's response to the student's terminal 12.

On the other hand, the response provided to the controller 24 might indicate that one or more words in the query or sentence structure are too sophisticated for the student. The response might also include words understood by the student which could be substituted for words in the query. Controller 24 would then cause a message generator 26 to generate an appropriate message on the native speaker's communication device 14. The message would inform the native speaker that his response is too complex and suggest an alternate response. The native speaker could then provide the alternate response, which is stored in buffer 16 in place of the original response. He then provides an indication to his terminal that an alternate response has been provided, and his terminal enables the new message in buffer 16 to be sent to the student's communication device 12.

Alternatively, the alternate response could be generated and sent to the student's communication device 12 automatically. It would be preferable, however, to provide some delay before the alternate response is sent, in order to give the native speaker the opportunity to cancel its transmission.

Further levels of sophistication could be built into controller 24. For example, should the response from the database manager 22 indicate that the student does not know one of the words in the query but will be learning it soon, controller 24 could enable the message in buffer 16 to be sent to the students communicational terminal and could simultaneously cause a message generator 28 to send an appropriate message to the student's communication device 12. That message could include a definition of the unknown word or, more preferably, a descriptive graphic for the word. It is also contemplated that the message could include an excerpt from a future lesson in which the unknown word or words are taught.

A further level of sophistication that could be added in a system involving spoken communication would be to provide voice transformation technology in the student's computing device. Software and devices which perform voice transformation are well known. Such technology can speed up or slow down speech without changing the sound of the voice. Thus, by entering a code or clicking on an area of a display screen of his computing device the student may slow down the native speaker's voice until he understands what is being said. Preferably, a message would be sent to the native speaker when the student performs this action, in order to notify him that he needs to slow down his speech. As a further level of sophistication, the voice transformer could retain the slower version of the native speaker's speech after the student has slowed it down a predetermined number of times within a predetermined interval of time.

Message generators 26 and 28 could have a fixed set of messages, with controller 24 indicating the message to be sent and the content to be inserted.

Figure 2:
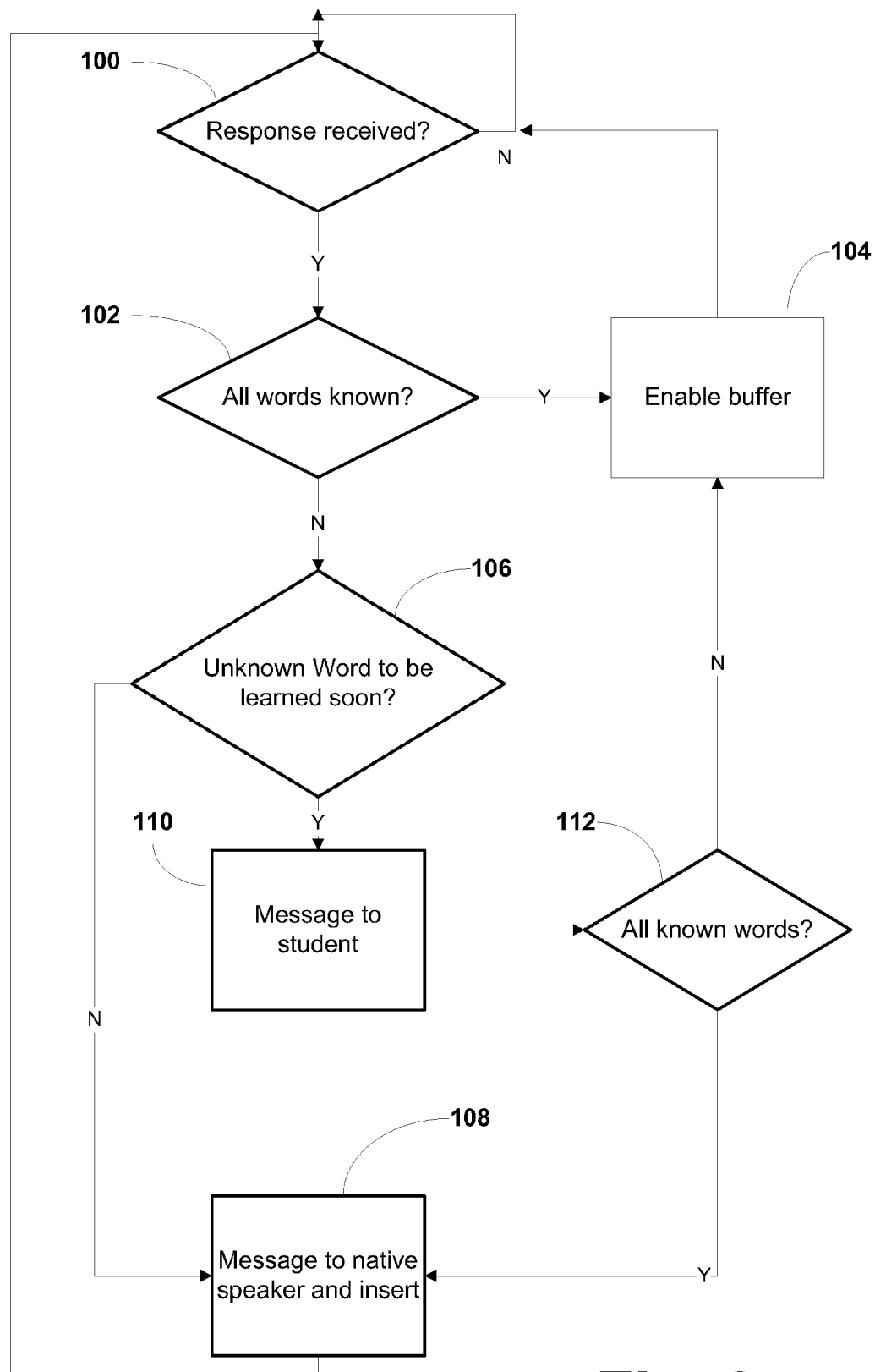
FIG. 2 is a flow chart illustrating the operation of controller 24 of FIG. 1.

FIG. 2 is a flow chart illustrating the operation of controller 24. In block 100, controller 24 awaits a response from database manager 22 and, upon receiving the response, transfers control to block 102. At block 102, a test is performed to determine if the response from database manager 22 indicates that all words in the query are known by the student. If so, transmission of the message in buffer 16 is enabled at block 104, and control returns to block 100, where receipt of further responses awaited.

Should the test at block 102 indicate that all of the words in the query were not known by the student, a further test is performed at block 106 to determine if any of the unknown words will be learned soon by the student. If not, control transfers to block 108, where message generator 26 is caused to generate a message to the native speaker suggesting an alternate response.

Should the test at block 106 indicate that one or more of the unknown words will be learned by the students soon, control transfers to block 110 where message generator 28 is caused to generate a message to the student defining those words. A test is then performed at block 112 to determine whether all of the unknown words are among those soon to be learned. If so, control transfers to block 104, where transmission of the message stored in buffer 16 is enabled. If not, control transfers to block 108 for generation of a message to the native speaker and, ultimately, return to block 100 to await receipt of a further response from the database manager.

Figure 3:
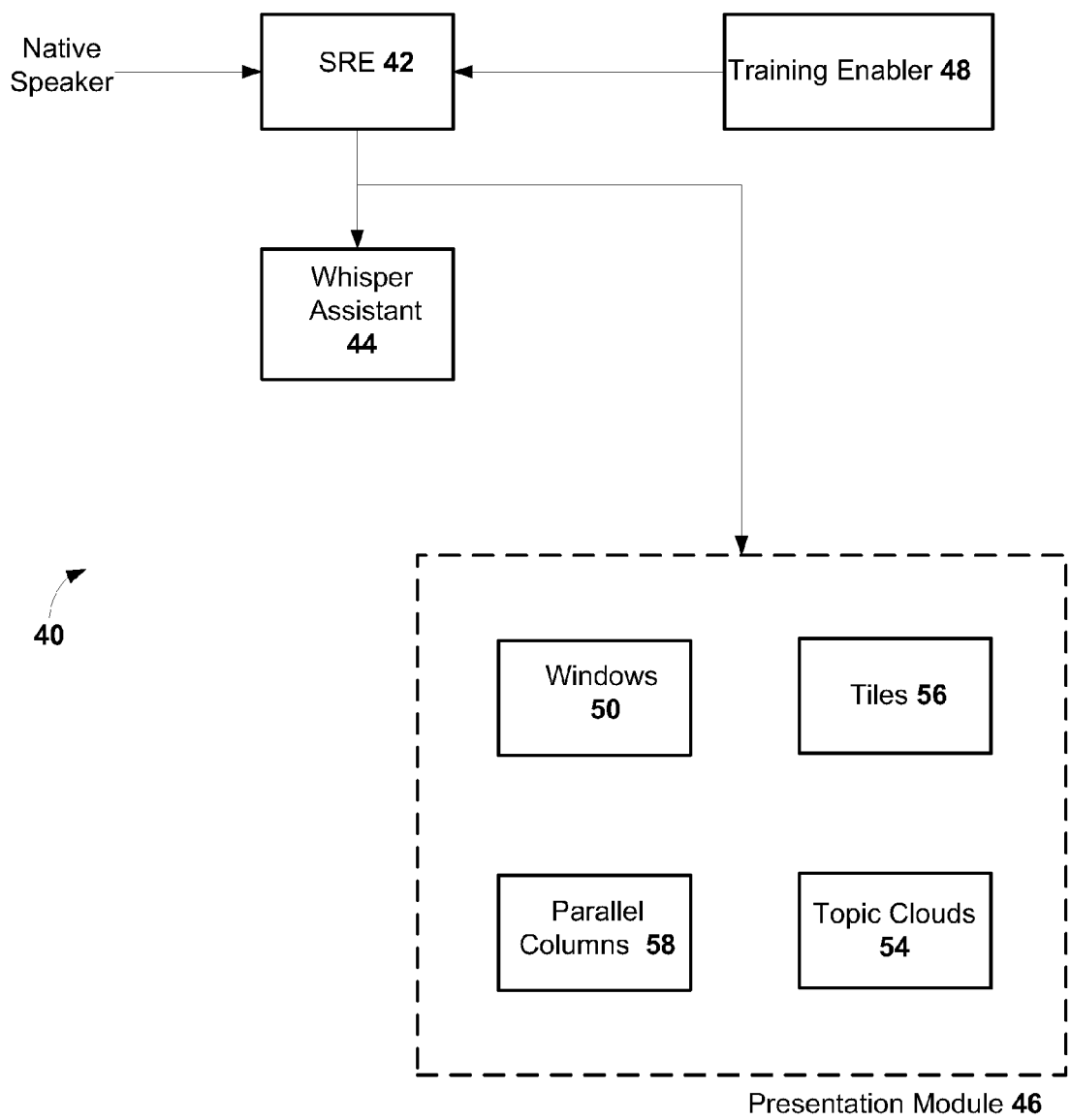
FIG. 3 is a block diagram illustrating a training and support module, according to an embodiment.

In accordance with an aspect of the present invention, it is contemplated that the native speaker be provided with training and support. FIG. 3 is a block diagram of a preferred training and support module 40 that will achieve this. Preferably, this module is provided on the native speaker's computing device 14 or made accessible to it, such as through a network connection. Module 40 includes a speech recognition engine (SRE) 42 which is preferably part of monitor 18. SRE 42 senses the native speaker's speech and converts it to text or some other processable form, for communication of information to query generator 20. A whisper assistant 44 and a presentation module 46 are enhancements to message generator 26. Whisper assistant 44 provides spoken communications, preferably synthesized, to the native speaker in his own language. That is, the communications provided by message generator 26 are presented to the native speaker as spoken messages. Similarly, presentation module 46 can present messages in the form of various types of presentations on the screen of the native speaker's computing device.

A training enabler 48 provided in the native speaker's computing device will place it into a training mode. That is, without receiving any communications from the student's computing device 12, the native speaker is enabled to carry on his side of the communication. Training enabler 48 could, for example, present prerecorded "communications" as if they came from a student, and the native speaker could provide his own responses. System 10 would operate as explained above, monitoring the native speaker's communications and sending appropriate messages. In the present instance, the messages may also be verbal, via whisperer assistant 44 or a presentation provided via module 46.

Those skilled in the art will appreciate that, although FIG. 3 shows SRE 42 communicating functionally with whisperer assistant 44 and presentation module 46, those communications are actually provided through system 10 as described previously. That is, the native speaker's communications are actually compared against the student's database and controller 24 causes communications with the native speaker as if he were actually communicating with the student. Thus, in preparation for a session with the student, the native speaker is able to get training just as if he were communicating with the student.

It is, however, contemplated that a collection of "standard" databases would be available to the native speaker. He would merely need to select the level of skill of the student (for example "8$^{th}$ grade") and the system would provide training at that level. This would be particularly useful in a non-teaching environment, such as in business communications. The native speaker need merely estimate the level of skill of the other person, and he would then receive appropriate training. Those skilled in the art will appreciate that this type of training could be free-standing, in that it all components could be incorporated into the native speaker's computing device.

Whisperer assistant 44 could provide a spoken version of messages that would normally be presented by message generator 26. For example, it could tell the native speaker when he needed to slow down his rate of speech, or it cold suggest words or phrases for substitution in his communication.

Presentation module 46 is capable of presenting a collection of available presentation modules on the display in the native speaker's computing device. For example, it could display any kind of window, including one with an image or audio. It could also display parallel columns 52, for example, one column showing the native speaker's communication and the other showing a recommended, modified form. It could also show topic clouds 54 with such topics as "food", "family", or "hobbies." The native speaker could click on this and be presented with appropriate vocabulary to be used with the student. Among the topic clouds, there could also be a "browse" cloud permitting the native speaker to browse for appropriate topics. The presentation module might also present a series of tiles 56 on the screen of the native speaker's computing device.

It will be appreciated that with the flexibility provided to train the native speaker, he could become a "specialist" in a very short time. For example, he could specialize in students at a certain level, or he could quickly learn the language associated with a particular line of business.

Those skilled in the art will appreciate that it would also be beneficial to provide the whisperer assistant 44 and presentation module 46 during actual communications with a student and not limit them to use during training.

Above, there has been a description of the present invention as embodied in a teaching system. However, those skilled in the art will appreciate that the utility of the present invention is not so limited. It would be useful in any instance in which a higher skilled person in a target language needs to communicate with a lesser skilled person in the language. For example, suppose an English speaker needs must carry out a business communication with a foreign individual whose ability in English is limited. Use of the present invention would facilitate communication between these two individuals. It would only be necessary to select the English level of skill for the foreign individual. This could be built in as an adjustment in the English speaker's communication device. For example, he could be offered a selection of a fifth-grade, eighth-grade or high school level of English proficiency, and he could then commence a verbal communication with the foreign individual at that level. If he suspects a communication is not going well. He could always adjust the level while carrying on the communication.

It will also be appreciated that the present invention is not limited to use with verbal communications. It could prove very valuable for written communications, as well.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A method comprising:
receiving, at a computer memory, a communication sent from a first individual having a first skill level in a target language and at a first computing device, the communication intended to be sent from the first individual at the first computing device to a second individual having a second skill level in the target language less than the first skill level and at a second computing device, the communication having vocabulary in the target language;
determining, at a computer processor, whether the vocabulary in the communication is within the second skill level such that the second individual will likely understand the vocabulary in the communication; and
if the result of the determining step indicates that the vocabulary in the communication is within the second skill level, forwarding the communication from the computer memory to the second individual at the second computing device;
if the result of the determining step indicates that the vocabulary in the communication is not within the second skill level, sending, to the second individual at the second computing device, alternative communication terminology in the target language that will likely be understood by the second individual.

2. The method of claim 1, further comprising:
if the result of the determining step indicates that the vocabulary in the communication is not within the second skill level, sending, to the second individual at the second computing device, information related to at least part of the communication.

3. The method of claim 1, wherein the sending step includes:
providing to the first individual at the first computing device an instruction related to the communication or suggesting alternative communication terminology that will likely be understood by the second individual; and
upon the first individual's adoption of the alternative terminology, sending the alternative communication terminology to the lesser skilled second individual at the second computing device.

4. The method of claim 3, wherein the instruction or the suggestion includes a visual representation.

5. The method of claim 4, wherein the communication is a verbal communication.

6. The method of claim 5, further comprising: utilizing speech recognition to sense words in the communication;
and comparing sensed words in the communication with words in the target language taught to by the second individual.

7. The method of claim 5, wherein the sending step includes:

providing, to the first individual at the first computing device in the form of synthesized speech, an instruction related to the communication or suggesting alternative communication terminology that will likely be understood by the second individual; and upon the first individual's adoption of the alternative terminology, sending the alternative communication terminology to the second individual.

8. The method of claim 1, further comprising: comparing the vocabulary in the communication with the vocabulary in the target language taught to the second individual.

9. The method of claim 3, wherein the suggesting step includes suggesting a word as a substitute for a word in the communication.

10. The method of claim 9, wherein the first individuals' adoption corresponds to his providing a communication with the alternative terminology.

11. The method of claim 1, wherein the determining step includes comparing said communication to stored information related to the second individual's ability in the target language.

12. The method of claim 11, wherein the stored information represents the second individual's vocabulary in the target language.

13. The method of claim 12, wherein the second individual is a student learning the target language and the stored information is obtained from a teaching apparatus which he is using to learn the target language.

14. The method of claim 1, wherein the second individual is a student being taught the target language on a teaching apparatus and the determining step is performed with information obtained from the teaching apparatus.

15. The method of claim 5, further comprising:
generating at a message generator component, a notification message configured to be sent to the first individual at the first computing device when a speech transformation component at the second computing device changes a speed at which the verbal communication is output from the second computing device.

16. A method, comprising:
receiving, at a computer memory, a communication sent from a first individual having a first skill level in a target language and at a first computing device, the communication intended to be sent from the first individual at the first computing device to a second individual having a second skill level in the target language less than the first skill level and at a second computing device, the communication having vocabulary in the target language;
determining, at a computer processor, whether the vocabulary in the communication is within the second skill level such that the second individual will likely understand the vocabulary in the communication; and
if the result of the determining step indicates that the vocabulary in the communication is within the second skill level, sending the communication from the computer memory to the second individual at the second computing device;
if the result of the determining step indicates that the vocabulary in the communication is not within the second skill level, sending the communication from the computer memory to the second individual at the second computing device and sending message with information related to at least part of the communication to the second individual at the second computing device.

17. The method of claim 16, wherein the communication is a verbal communication.

18. The method of claim 17, further comprising: utilizing speech recognition to sense words in the communication; and
comparing sensed words in the communication with the words in the target language taught to the second individual.

19. The method of claim 17, further comprising: comparing the vocabulary in the communication with the vocabulary in the target language taught to the second individual to determine whether the vocabulary in the communication is within the second skill level.

20. The method of claim 17, further comprising the step of:
comparing the vocabulary in the communication to stored information related to the second skill level.

21. The method of claim 20, wherein the stored information represents the second individual's vocabulary in the target language.

22. The method of claim 21, wherein the second individual is a student being taught the target language and the stored information is obtained from a teaching apparatus associated with teaching the second individual the target language.

23. The method of claim 17, wherein the information includes an explanation of a word or a phrase in the communication that has not been taught to the second individual.

24. The method of claim 17, wherein the information includes a visual representation of a word in the communication that has not been taught to the second individual.

25. The method of claim 16, wherein the second individual is a student being taught the target language on a teaching apparatus and the determining step is performed with information obtained from the teaching apparatus.

26. The method of claim 17, further comprising:
generating, at a message generator component, a notification message configured to be sent to the first individual at the first computing device when a speech transformation component at the second computing device changes a speed at which the verbal communication is output from the second computing device.

27. Apparatus for improving communication between a skilled individual and a lesser skilled individual in a target language, comprising:
a monitor for communications from the skilled individual to the lesser skilled individual;
a processor communicating with the monitor and determining whether a monitored communication is within the skill in the target language of the lesser skilled individual, the processor:
causing a communication to be forwarded to the lesser skilled individual if it determines that the communication is within the skill in the target language of the lesser skilled individual;
causing an alternative communication in said target language to be sent to the lesser skilled individual which he can understand, if the processor determines that the communication is not within the skill.

28. The apparatus of claim 27, wherein the processor causes to be sent to the lesser skilled individual information related to at least part of the communication, if the processor determines that the communication is not within the skill.

29. The apparatus of claim 27 wherein causing an alternative communication to be sent comprises:
providing to the skilled individual an instruction related to the communication or suggesting to the skilled individual alternative communication terminology that would be understood by the lesser skilled individual, if it is determined that the communication is not within the skill in the target language of the lesser skilled individual; and causing the alternative communication terminology to be forwarded to the lesser skilled individual upon the skilled individual's adoption of the alternative terminology.

30. The apparatus of claim 29 wherein the instruction or the suggestion includes a visual display.

31. The apparatus of claim 27 wherein the communication is a verbal communication.

32. The apparatus of claim 31 further comprising speech recognition means sensing words in the communication the processor comparing sensed words in the communication with the words in the target language known by the lesser skilled individual.

33. The apparatus of claim 31 wherein causing an alternative communication to be sent comprises:
    providing to the skilled individual an instruction related to the communication or suggesting to the skilled individual alternative communication terminology that would be understood by the lesser skilled individual, if it is determined that the communication is not within the skill in the target language of the lesser skilled individual; and
    causing the alternative communication terminology to be forwarded to the lesser skilled individual upon the skilled individual's adoption of the alternative terminology.

34. The apparatus of claim 27 wherein the processor compares the vocabulary in the communication with the vocabulary in the target language known by the lesser skilled individual.

35. The apparatus of claim 29 wherein the processor suggests a word as a substitute for a word in the communication.

36. The apparatus of claim 27 wherein the processor compares said communication to stored information related to the lesser skilled individual's ability in the target language.

37. The apparatus of claim 36 wherein the lesser skilled individual is a student learning the target language on a teaching apparatus and the stored information is obtained from the teaching apparatus.

38. The apparatus of claim 31 further comprising speech transformation means which changes the speed of a verbal message, the speech transformation means being controlled by the lesser skilled individual to process the communication.

39. The apparatus of claim 38 wherein the processor notifies the skilled individual when the lesser skilled individual controls the speech transformation means.

40. The apparatus of claim 38, wherein the processor continues the control exercised by the lesser skilled individual after he has exercised it a predetermined number of times within a predetermined period of time.

41. Apparatus for improving communication between a skilled individual and a lesser skilled individual in a target language, comprising:
    a monitor for communications from the skilled individual to the lesser skilled individual;
    a processor communicating with the monitor and determining whether a monitored communication is within the skill in the target language of the lesser skilled individual, the processor:
    causing a communication to be forwarded to the lesser skilled individual if it determines that the communication is within the skill in the target language of the lesser skilled individual; and
    causing a communication to be forwarded to the lesser skilled individual with additional information related to at least part of the communication if it determines that the communication is not within the skill in the target language of the lesser skilled individual.

42. The apparatus of claim 41 wherein the communication is a verbal communication.

43. The apparatus of claim 42 further comprising speech recognition means sensing words in the communication the processor comparing sensed words in the communication with the words in the target language known by the lesser skilled individual.

44. The apparatus of claim 41 wherein the processor compares the vocabulary in the communication with the vocabulary in the target language known by the lesser skilled individual.

45. The apparatus of claim 41 wherein the additional information comprises an explanation of a word or phrase in the communication.

46. The apparatus of claim 41 wherein the additional information is a visual representation of a word in the communication.

47. The apparatus of claim 41 wherein the processor compares said communication to stored information related to the lesser skilled individual's ability in the target language.

48. The apparatus of claim 41 wherein the lesser skilled individual is a student learning the target language on a teaching apparatus and the stored information is obtained from the teaching apparatus.

49. The apparatus of claim 42 further comprising speech recognition means sensing words in the communication the processor comparing sensed words in the communication with the words in the target language known by the lesser skilled individual.

50. The apparatus of claim 42 further comprising speech transformation means which changes the speed of a verbal message, the speech transformation means being controlled by the lesser skilled individual to process the communication.

51. The apparatus of claim 50 wherein the processor notifies the skilled individual when the lesser skilled individual controls the speech transformation means.

52. The apparatus of claim 50, wherein the processor continues the control exercised by the lesser skilled individual after he has exercised it a predetermined number of times within a predetermined period of time.

53. A method, comprising:
    receiving, at a computer memory, a communication sent from a first individual having a first skill level in a target language and at a computing device, the communication having vocabulary in the target language, the first individual being trained to communicate with a second individual having a second skill level in the target language less than the first skill level;
    determining, at a computer processor, whether the vocabulary in the communication is within the second skill level such that the second individual will likely understand the vocabulary in the communication; and
    if the result of the determining step indicates that the vocabulary in the communication is not within the second skill level, providing to the first individual at the computing device an instruction related to the communication or suggesting to the first individual an alternative communication that will likely be understood by the second individual.

54. The method of claim 53, wherein the instruction or the suggestion includes a visual display.

55. The method of claim 53, wherein the communication is a verbal communication.

56. The method of claim 55, further comprising: utilizing speech recognition to sense words in the communication; and comparing sensed words in the communication with the words in the target language taught to the second individual.

57. The method of claim 53, further comprising: comparing the vocabulary in the communication with vocabulary in the target language taught to the second individual to determine whether the vocabulary in the communication is within the second skill level.

58. The method of claim 53, further comprising the step of: comparing the vocabulary in the communication to stored information related to the second skill level.

59. The method of claim 58, wherein the stored information represents the second individual's vocabulary in the target language.

60. The method of claim 58, wherein the second individual is a student being taught the target language and the stored information is obtained from a teaching apparatus associated with teaching the second individual the target language.

61. The method of claim 58, wherein the stored information represents the ability of an individual at a selected level of skill.

62. Apparatus for training a skilled individual to communicate with a lesser skilled individual in a target language, comprising:
a monitor for communications from the skilled individual to the lesser skilled individual;
a processor communicating with the monitor and determining whether a monitored communication is within the skill in the target language of the lesser skilled individual and, if not, providing to the skilled individual an instruction related to the communication or suggesting to the skilled individual alternative communication terminology that would be understood by the lesser skilled individual.

63. The apparatus of claim 62 wherein the instruction or the suggestion includes a visual display.

64. The apparatus of claim 62 wherein the communication is a verbal communication.

65. The apparatus of claim 64 further comprising speech recognition means sensing words in the communication the processor comparing sensed words in the communication with the words in the target language known by the lesser skilled individual.

66. The apparatus of claim 62 wherein the processor compares the vocabulary in the communication with the vocabulary in the target language known by the lesser skilled individual.

67. The apparatus of claim 62 wherein the processor suggests a word as a substitute for a word in the communication.

68. The apparatus of claim 62 wherein the processor compares said communication to stored information related to the lesser skilled individual's ability in the target language.

69. The apparatus of claim 62 wherein the lesser skilled individual is a student learning the target language on a teaching apparatus and the stored information is obtained from the teaching apparatus.

70. The apparatus of claim 62 wherein the stored information represents the ability of an individual at a selected level of skill.

* * * * *